United States Patent
Hutton

(10) Patent No.: US 7,603,737 B2
(45) Date of Patent: Oct. 20, 2009

(54) PASSENGER BOARDING BRIDGE ALIGNMENT SYSTEM AND METHOD THEREFOR

(75) Inventor: Neil Hutton, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 612 days.

(21) Appl. No.: 11/518,178

(22) Filed: Sep. 11, 2006

(65) Prior Publication Data

US 2008/0060145 A1    Mar. 13, 2008

(51) Int. Cl.
*G08G 5/00* (2006.01)

(52) U.S. Cl. .................. 14/71.5; 340/686.2; 340/686.6; 340/958; 250/206.1

(58) Field of Classification Search .................. 14/71.5; 340/686.2, 686.6, 958; 250/206.1
See application file for complete search history.

(56) References Cited

U.S. PATENT DOCUMENTS

| | | | |
|---|---|---|---|
| 5,166,746 A * | 11/1992 | Sato et al. ................ | 356/141.2 |
| 5,226,204 A | 7/1993 | Schoenberger et al. | |
| 6,100,964 A * | 8/2000 | De Cremiers .............. | 356/4.01 |
| 6,637,063 B1 | 10/2003 | Hutton et al. | |
| 6,724,314 B2 | 4/2004 | Hutton | |
| 6,742,210 B2 | 6/2004 | Hutton et al. | |
| 6,757,927 B2 | 7/2004 | Hutton et al. | |
| 6,907,635 B2 | 6/2005 | Hutton et al. | |
| 7,093,314 B2 | 8/2006 | Hutton et al. | |
| 7,137,162 B2 | 11/2006 | Spencer et al. | |
| 2003/0057360 A1 | 3/2003 | Anderberg | |
| 2003/0120358 A1 | 6/2003 | Hutton | |
| 2003/0136898 A1 | 7/2003 | Oki et al. | |
| 2006/0277699 A1 | 12/2006 | Hutton | |
| 2006/0287780 A1 | 12/2006 | Hutton | |
| 2006/0288502 A1 | 12/2006 | Hutton | |
| 2006/0288503 A1 | 12/2006 | Hutton | |
| 2007/0214584 A1 | 9/2007 | Hutton | |

FOREIGN PATENT DOCUMENTS

WO    WO 2004/085250 A1    10/2004

OTHER PUBLICATIONS

U.S. Appl. No. 11/589,737, Hutton.

* cited by examiner

*Primary Examiner*—Raymond W Addie
(74) *Attorney, Agent, or Firm*—Freedman & Associates

(57) ABSTRACT

In a method for aligning an aircraft-engaging end of a passenger boarding bridge with a doorway of an aircraft, a first sensor disposed aboard the aircraft is used for sensing first information relating to a current bridge alignment operation and a second sensor disposed at a location that is remote from the aircraft is used for sensing second information relating to the current bridge alignment operation. The sensed first information and the sensed second information are received at a processor. The processor subsequently determines instruction data for moving the aircraft-engaging end of the passenger boarding bridge along a direction toward the doorway of the aircraft, based upon the sensed first information and the sensed second information.

29 Claims, 9 Drawing Sheets

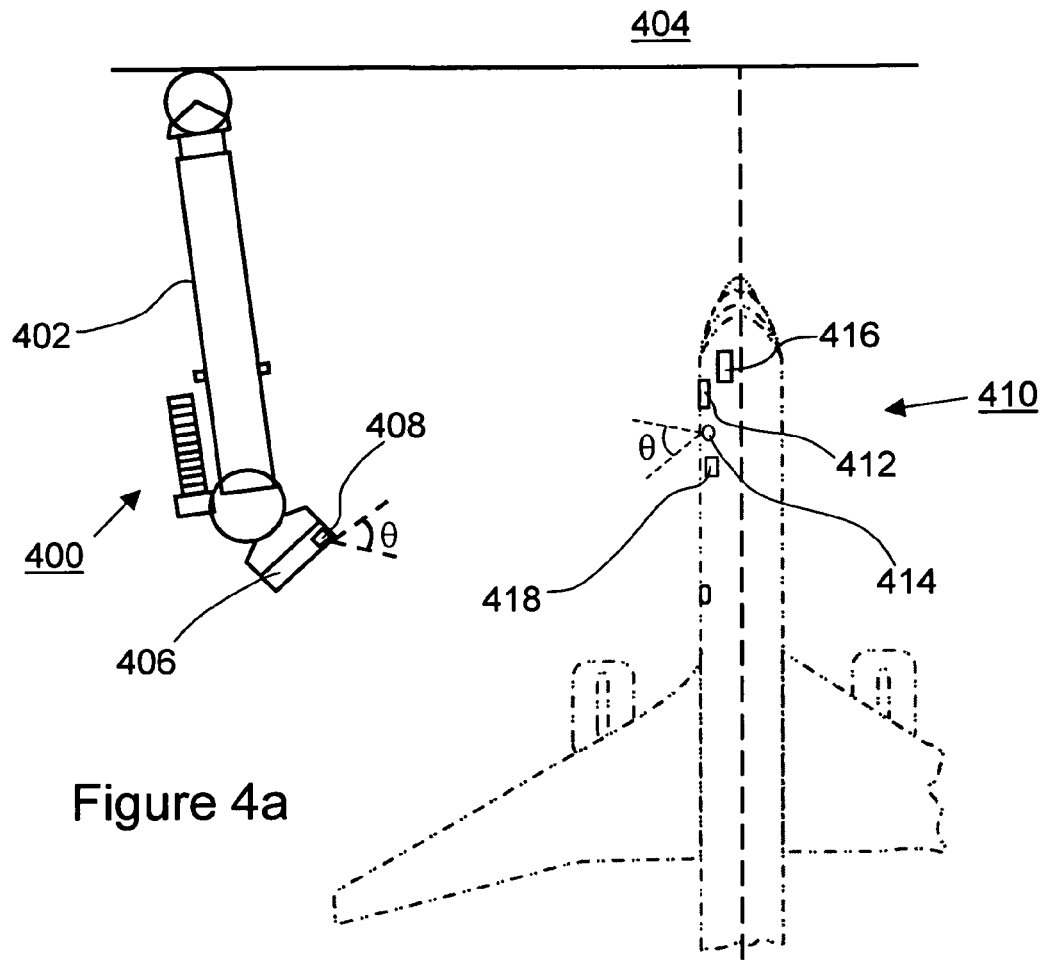
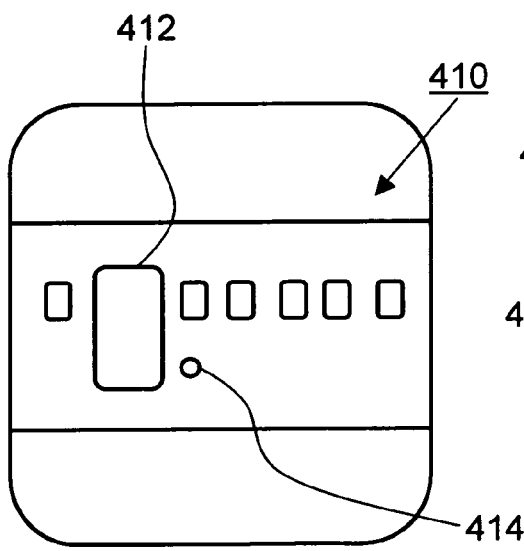
Figure 4b
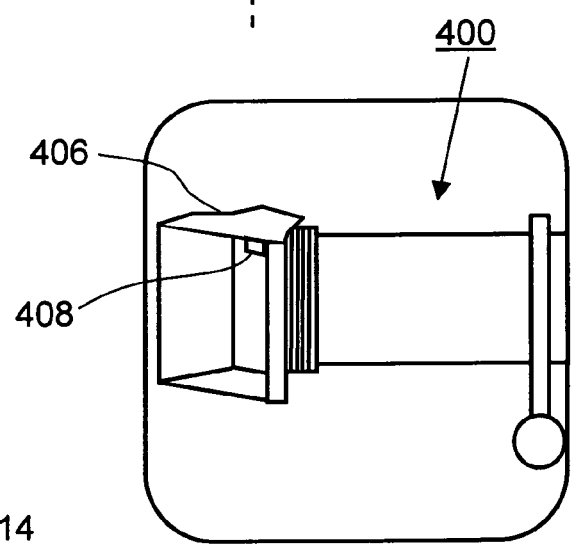
Figure 4c
Figure 4a

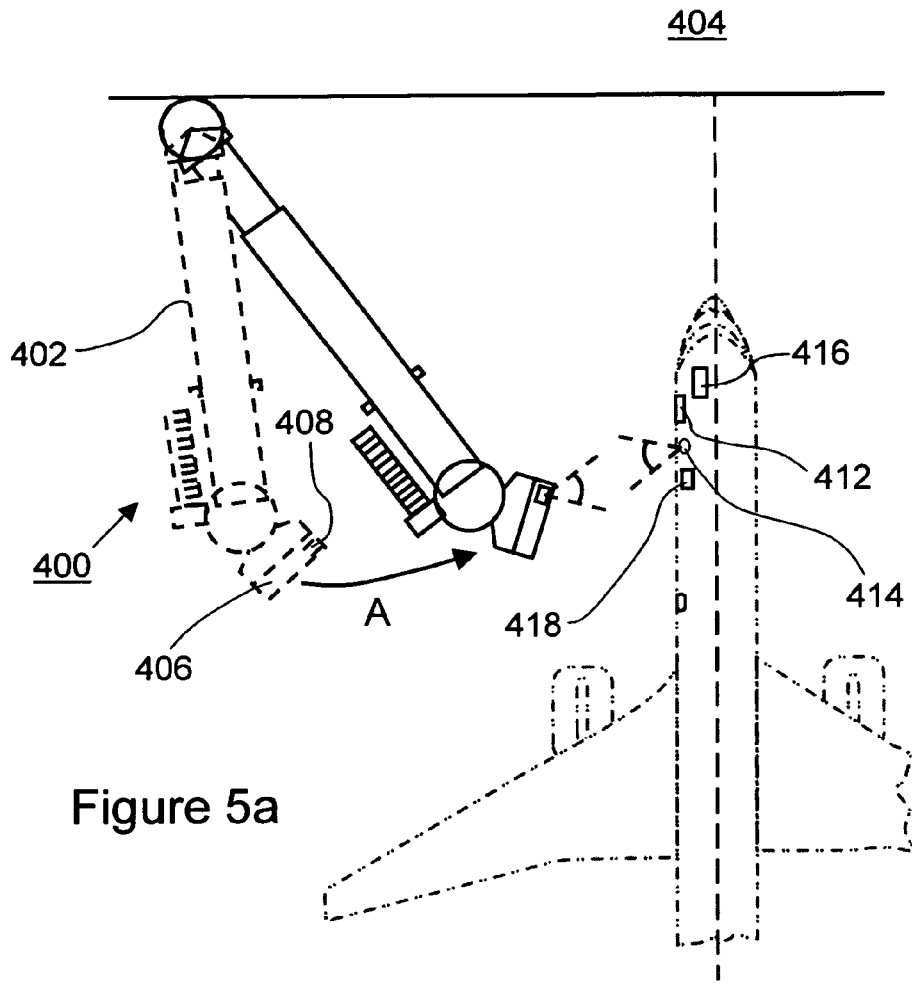
Figure 5a
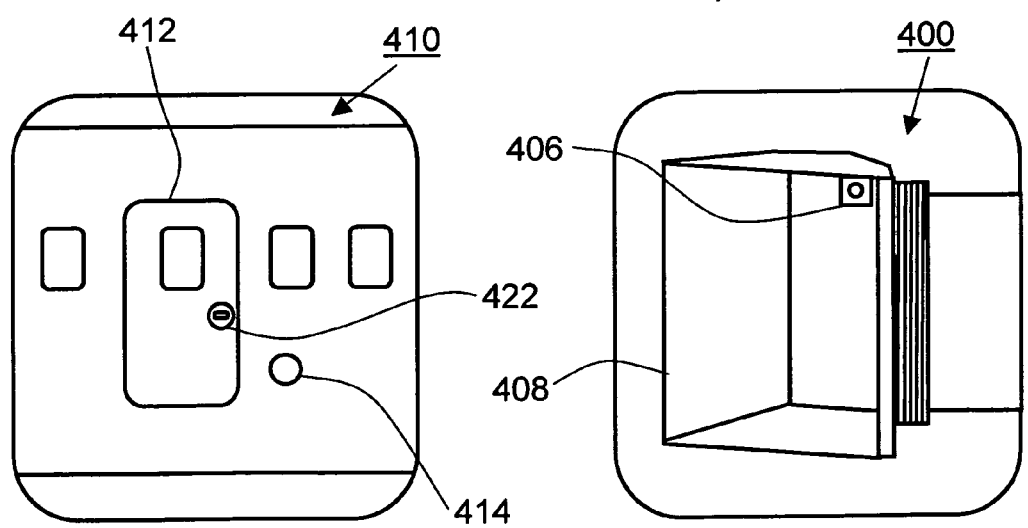
Figure 5b
Figure 5c

PASSENGER BOARDING BRIDGE ALIGNMENT SYSTEM AND METHOD THEREFOR

FIELD OF THE INVENTION

The instant invention relates generally to passenger boarding bridges, and more particularly to a method and system for aligning an aircraft-engaging end of a passenger boarding bridge with a doorway of an aircraft.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge in present day use includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges. These types of passenger boarding bridges are adjustable, for instance to compensate for different sized aircraft and to compensate for imprecise parking of aircraft at an airport terminal.

A manual bridge alignment system requires that a human operator is present to perform the alignment operation each time an aircraft arrives. Delays occur when the human operator is not standing-by to perform the alignment operation as soon as the aircraft comes to a stop. In addition, human operators are prone to errors that result in the passenger boarding bridge being driven into the aircraft or into a piece of ground service equipment. Such collisions involving the passenger boarding bridge are costly and also result in delays. In order to avoid causing a collision, human operators tend to err on the side of caution and drive the passenger boarding bridge slowly and cautiously.

Semi-automated bridge alignment systems also require a human operator, but the human operator may be present at a remote location and interact with the bridge control system in a tele-robotic manner. One human operator may interact with a plurality of different passenger boarding bridges, thereby reducing the costs associated with training and paying the salaries of human operators. Alternatively, certain movements of the bridge are automated, whilst other movements are performed under the control of the human operator.

Automated bridge alignment systems provide a number of advantages compared to manual and semi-automated systems. For instance, automated bridge alignment systems do not require a human operator, and therefore the costs that are associated with training and paying the salaries of human operators are reduced or eliminated. Furthermore, an automated bridge alignment system is always standing by to control the passenger boarding bridge as soon as an aircraft comes to a stop. Accordingly, delays associated with dispatching a human operator to perform a bridge alignment operation are eliminated, particularly during periods of heavy aircraft traffic.

Early attempts at automated bridge alignment systems employed imagers and sensors disposed on or about the passenger boarding bridge, for sensing locations of aircraft doorways and for sensing close approach of the bridge to the aircraft. More recently, automated bridge alignment systems have been developed in which beacon docking signals and/or control signals are transmitted wirelessly between an aircraft and a passenger boarding bridge, as described for example in U.S. Pat. Nos. 6,637,063, 6,742,210, 6,757,927 and 6,907,635, the entire contents of all of which are incorporated herein by reference. Other systems relying upon wireless transmission of signals between an aircraft and a passenger boarding bridge during alignment are disclosed in U.S. patent applications Ser. Nos. 11/149,401, 11/155,502, 11/157,934 and 11/157,938, the entire contents of all of which are incorporated herein by reference. Unfortunately, automated bridge alignment systems still are prone to errors that result in the passenger boarding bridge being driven into the aircraft.

SUMMARY OF EMBODIMENTS OF THE INVENTION

In accordance with an aspect of the instant invention there is provided a method of aligning an aircraft-engaging end of a passenger boarding bridge with a doorway of an aircraft, comprising: using a first sensor disposed aboard the aircraft, sensing first information relating to a current bridge alignment operation; using a second sensor disposed at a location that is remote from the aircraft, sensing second information relating to the current bridge alignment operation; receiving the sensed first information and the sensed second information at a processor; and, using the processor, determining instruction data for moving the aircraft-engaging end of the passenger boarding bridge along a direction toward the doorway of the aircraft, based upon the sensed first information and the sensed second information.

In accordance with another aspect of the instant invention there is provided a method of aligning an aircraft-engaging end of a passenger boarding bridge with a doorway of an aircraft, comprising: using a first sensor disposed aboard the aircraft, capturing first image data relating to a current bridge alignment operation; using a second sensor disposed at a location that is remote from the aircraft, capturing second image data relating to the current bridge alignment operation; generating a first input signal relating to the first image data; generating a second input signal relating to the second image data; receiving the first input signal and the second input signal at a processor; and, when a correlation between the first input signal and the second input signal is established that is within a predetermined range of threshold values, determining a control signal comprising instruction data for moving the aircraft-engaging end of the passenger boarding bridge along a direction toward the doorway of the aircraft.

In accordance with another aspect of the instant invention there is provided a system for aligning an aircraft-engaging end of a passenger boarding bridge with a doorway of an aircraft, comprising: a first sensor disposed aboard the aircraft for sensing first information relating to a current bridge alignment operation; a second sensor disposed at a location that is remote from the aircraft, for sensing second information relating to the current bridge alignment operation; a processor in communication with the first sensor and with the second sensor for receiving the sensed first information and the sensed second information, respectively, and for determining instruction data for moving the aircraft-engaging end of the passenger boarding bridge along a direction toward the doorway of the aircraft, based upon a predetermined correlation between the sensed first information and the sensed second information.

BRIEF DESCRIPTION OF THE DRAWINGS

Exemplary embodiments of the invention will now be described in conjunction with the following drawings, in which similar reference numbers designate similar items:

FIG. 4a is a simplified top view of a passenger boarding bridge in a stowed position relative to a nose-in parked aircraft;

FIG. 4b is an example of image data captured by an imager disposed aboard the passenger boarding bridge, when the passenger boarding bridge is in a stowed position and the aircraft is parked within a parking spaced that is defined adjacent to the passenger boarding bridge;

FIG. 4c is an example of image data captured by an imager disposed aboard the aircraft, when the passenger boarding bridge is in a stowed position and the aircraft is parked within a parking spaced that is defined adjacent to the passenger boarding bridge;

FIG. 5a is a simplified top view of a passenger boarding bridge relative to a nose-in parked aircraft after having moved along 'path A' from a stowed position;

FIG. 5b is an example of image data captured by an imager disposed aboard the passenger boarding bridge, during the intermediate phase of a bridge alignment operation as shown in FIG. 5a;

FIG. 5c is an example of image data captured by an imager disposed aboard the aircraft, during the intermediate phase of a bridge alignment operation as shown in FIG. 5a;

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
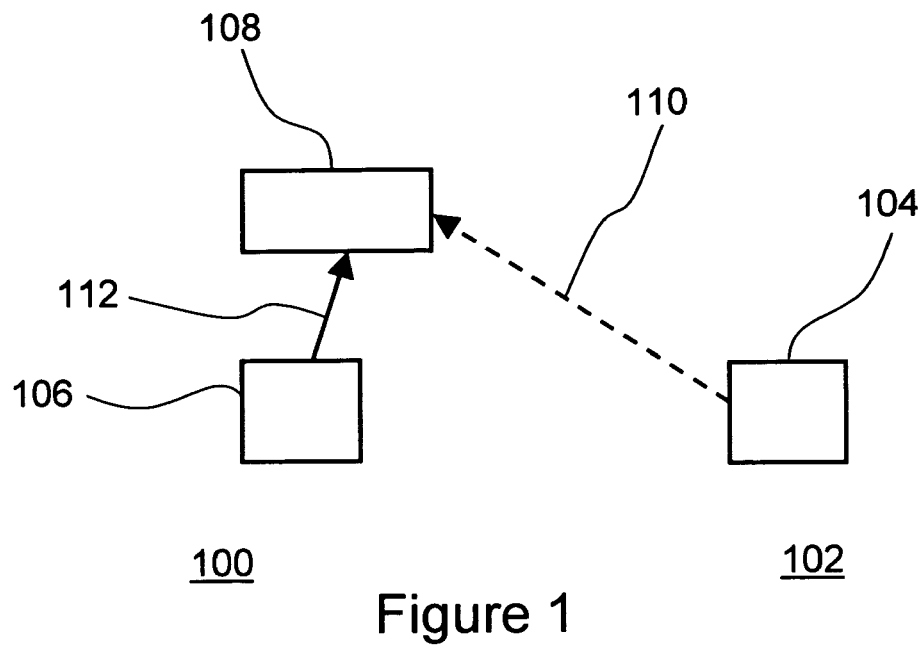
FIG. 1 is a simplified block diagram of a system for aligning an aircraft-engaging end of a passenger boarding bridge with a doorway of an aircraft, according to an embodiment of the instant invention.

Referring to FIG. 1, shown is a simplified block diagram of a system for aligning an aircraft-engaging end of a passenger boarding bridge to a doorway of an aircraft, according to an embodiment of the instant invention. For instance, the passenger boarding bridge is selected from a plurality of automated passenger boarding bridges at an airport terminal building, and has an aircraft parking space defined adjacent thereto. The system includes components shown generally at 100, which are disposed at a location that is remote from the aircraft, and components shown generally at 102, which are disposed aboard the aircraft. By way of a non-limiting example, the components 100 are disposed near the aircraft-engaging end of the passenger boarding bridge, and the components 102 are disposed along a lateral surface of the aircraft and proximate the doorway to which the aircraft-engaging end of the passenger boarding bridge is to be aligned. The components 102 that are disposed aboard the aircraft include a first sensor 104 for sensing first information relating to a current bridge alignment operation. For instance, the first sensor 104 is provided in the form of a first imaging device, such as for instance one of a digital still camera and a video camera, for capturing first image data relating to the current bridge alignment operation. The components 100 disposed at the location that is remote from the aircraft include a second sensor 106 for sensing second information relating to the current bridge alignment operation. For instance, the second sensor 106 is provided in the form of a second imaging device, such as for instance one of a digital still camera and a video camera, for capturing second image data relating to the current bridge alignment operation. In the instant example, a processor 108 is also defined as being one of the components 100 disposed at the location that is remote from the aircraft. Optionally, the processor 108 is disposed proximate the aircraft-engaging end of the passenger boarding bridge. Further optionally, the processor 108 is disposed at a location within the terminal building or even an off-site location. During use, the sensed first information is provided to the processor 108 via a wireless communications pathway 110 and the sensed second information is provided to the processor 108 via communications pathway 112. Of course, some portions of the wireless communications pathway 110 are not wireless, however at least a portion of the pathway between the first sensor 104 and the processor 108 involves free-space transmission of the sensed first information, which for instance is encoded as one of an optical signal and a RF signal. After receiving the sensed first information and the sensed second information, the processor 108 determines instruction data for moving the aircraft-engaging end of the passenger boarding bridge along a direction toward the doorway of the aircraft, based upon a predetermined correlation between the sensed first information and the sensed second information.

By way of a non-limiting example, the predetermined correlation requires that the sensed first information is indicative of the presence of the passenger boarding bridge adjacent to the aircraft, and that the sensed second information is indicative of the presence of the aircraft adjacent to the passenger boarding bridge. By way of another non-limiting example, the predetermined correlation requires that the sensed first information and the sensed second information is indicative of an unobstructed pathway between the passenger boarding bridge and the doorway of the aircraft. By way of yet another non-limiting example, the predetermined correlation requires that the sensed first information and the sensed second information is indicative of the aircraft-engaging end of the passenger boarding bridge moving toward the doorway of the aircraft.

Figure 2:
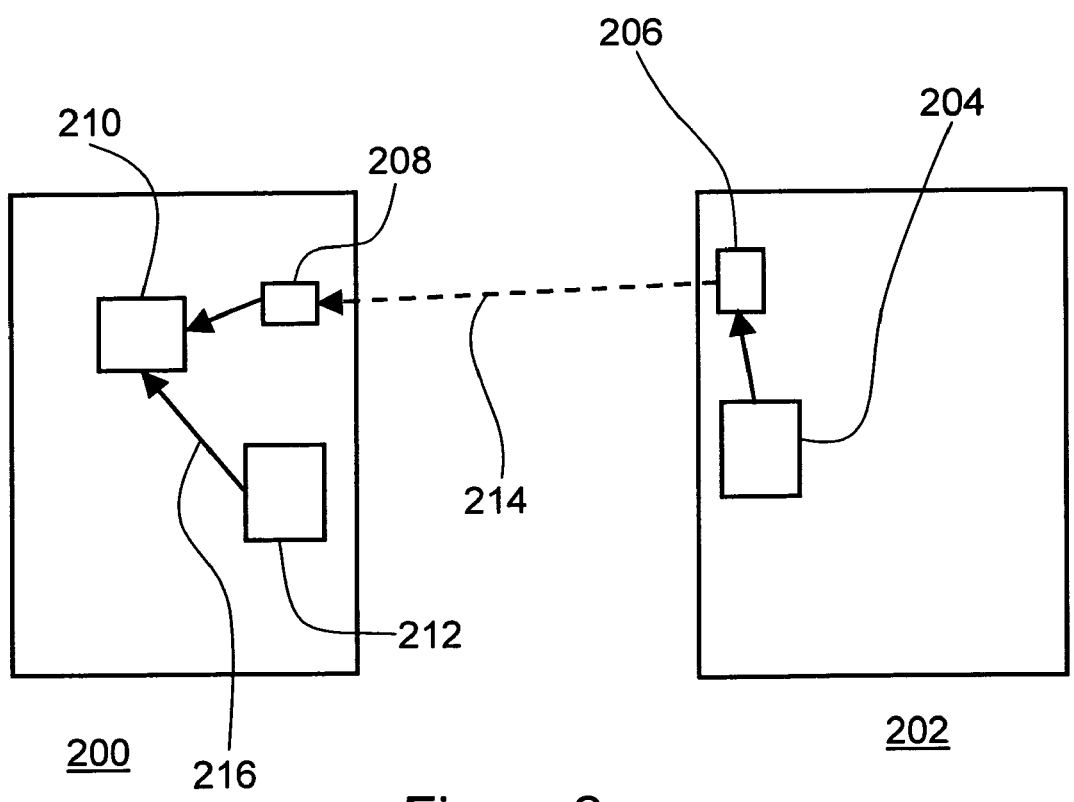
FIG. 2 is a simplified block diagram of a system for aligning an aircraft-engaging end of a passenger boarding bridge with a doorway of an aircraft, according to an embodiment of the instant invention.

Referring now to FIG. 2, shown is a simplified block diagram of a system for aligning an aircraft-engaging end of a passenger boarding bridge to a doorway of an aircraft, according to an embodiment of the instant invention. For instance, the passenger boarding bridge is selected from a plurality of automated passenger boarding bridges at an airport terminal building, and has an aircraft parking space defined adjacent thereto. The system includes components shown generally at 200, which are disposed at a location that is remote from the aircraft, and components shown generally at 202, which are disposed aboard the aircraft. By way of a non-limiting example, the components 200 are disposed near the aircraft-engaging end of the passenger boarding bridge. The components 202 that are disposed aboard the aircraft include a first sensor 204 for sensing first information relating to a current bridge alignment operation. For instance, the first sensor 204 is provided in the form of a first imaging device, such as for instance one of a digital still camera and a video camera, for capturing first image data relating to the current bridge alignment operation. By way of a non-limiting example, the first sensor 204 is disposed along a lateral surface of the aircraft and proximate the doorway to which the aircraft-engaging end of the passenger boarding bridge is to be aligned. The components 202 also include a wireless transmitter 206 that is in communication with the first sensor 204. An electrical signal relating to the sensed first information is provided from the first sensor 204 to the wireless transmitter 206, which encodes the sensed first information as one of an optical signal and a RF signal for free-space transmission. The components 200 disposed at the location that is remote from the aircraft include a receiver 208 that is in communication with a processor 210. The receiver 208 receives the signal transmitted from the wireless transmitter 206 and provides to the processor 210 an electrical signal relating to the received signal. The components 200 also include a second sensor 212 for sensing second information relating to the current bridge alignment operation. For instance, the second sensor 212 is provided in the form of a second imaging device, such as for instance one of a digital still camera and a video camera, for capturing second image data relating to the current bridge alignment operation. In the instant example, the processor 210 is also defined as being one of the components 200 disposed at the location that is remote from the aircraft. Optionally, the processor 210 is disposed proximate the aircraft-engaging end of the passenger boarding bridge. Further optionally, the processor 210 is disposed at a location within the terminal building or even an off-site location.

During use, the sensed first information is provided to the processor 210 via the receiver 208. At least a portion of the pathway between the wireless transmitter 206 and the processor 210 involves free-space transmission 214 of the sensed first information encoded as, for instance, one of an optical signal and a RF signal. The sensed second information is provided to the processor 210 via communications pathway 216. After receiving the sensed first information and the sensed second information, the processor 210 determines instruction data for moving the aircraft-engaging end of the passenger boarding bridge along a direction toward the doorway of the aircraft, based upon a predetermined correlation between the sensed first information and the sensed second information.

By way of a non-limiting example, the predetermined correlation requires that the sensed first information is indicative of the presence of the passenger boarding bridge adjacent to the aircraft, and that the sensed second information is indicative of the presence of the aircraft adjacent to the passenger boarding bridge. By way of another non-limiting example, the predetermined correlation requires that the sensed first information and the sensed second information is indicative of an unobstructed pathway between the passenger boarding bridge and the doorway of the aircraft. By way of yet another non-limiting example, the predetermined correlation requires that the sensed first information and the sensed second information is indicative of the aircraft-engaging end of the passenger boarding bridge moving toward the doorway of the aircraft.

Figure 3:
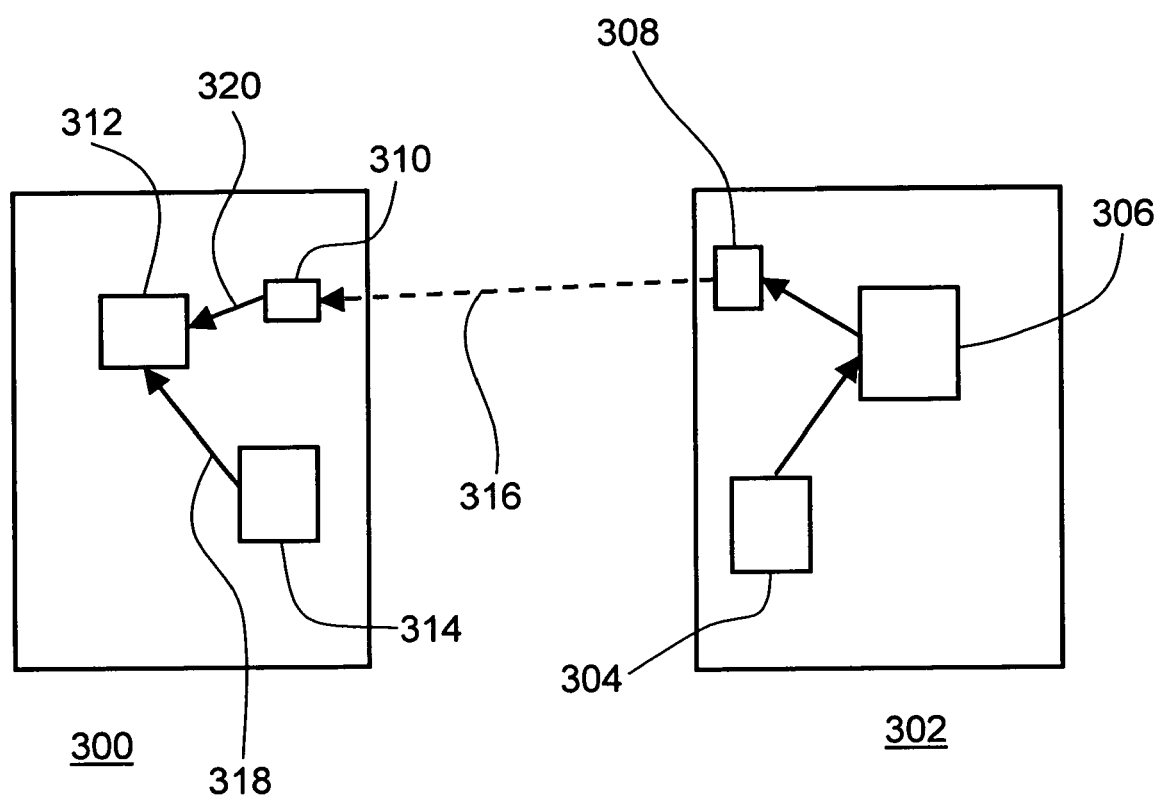
FIG. 3 is a simplified block diagram of a system for aligning an aircraft-engaging end of a passenger boarding bridge with a doorway of an aircraft, according to an embodiment of the instant invention.

Referring now to FIG. 3, shown is a simplified block diagram of a system for aligning an aircraft-engaging end of a passenger boarding bridge to a doorway of an aircraft, according to an embodiment of the instant invention. For instance, the passenger boarding bridge is selected from a plurality of automated passenger boarding bridges at an airport terminal building, and has an aircraft parking space defined adjacent thereto. The system includes components shown generally at 300, which are disposed at a location that is remote from the aircraft, and components shown generally at 302, which are disposed aboard the aircraft. By way of a non-limiting example, the components 300 are disposed near the aircraft-engaging end of the passenger boarding bridge. The components 302 that are disposed aboard the aircraft include a first sensor 304 for sensing first information relating to a current bridge alignment operation. For instance, the first sensor 304 is provided in the form of a first imaging device, such as for instance one of a digital still camera and a video camera, for capturing first image data relating to the current bridge alignment operation. By way of a non-limiting example, the first sensor 304 is disposed along a lateral surface of the aircraft and proximate the doorway to which the aircraft-engaging end of the passenger boarding bridge is to be aligned. The components 302 also include a processor 306 in communication with the first sensor 304 for receiving the sensed first information therefrom, and for pre-processing the sensed first information. The components 302 further include a wireless transmitter 308 that is in communication with the processor 306. An electrical signal relating to the pre-processed sensed first information is provided from the processor 306 to the wireless transmitter 308, which then encodes the pre-processed sensed first information as one of an optical signal and a RF signal for free-space transmission. The components 300 disposed at the location that is remote from the aircraft include a receiver 310 that is in communication with a processor 312. The receiver 310 receives the signal transmitted from the wireless transmitter 308 and provides to the processor 312 an electrical signal relating to the received signal. The components 300 also include a second sensor 314 for sensing second information relating to the current bridge alignment operation. For instance, the second sensor 314 is provided in the form of a second imaging device, such as for instance one of a digital still camera and a video camera, for capturing second image data relating to the current bridge alignment operation. In the instant example, the processor 312 is also defined as being one of the components 300 disposed at the location that is remote from the aircraft. Optionally, the processor 312 is disposed proximate the aircraft-engaging end of the passenger boarding bridge. Further optionally, the processor 312 is disposed at a location within the terminal building or even an off-site location.

During use, the sensed first information is provided to the processor 312 via the receiver 310. At least a portion of the pathway between the wireless transmitter 308 and the processor 312 involves free-space transmission 316 of the sensed first information encoded as, for instance, one of an optical signal and a RF signal. The sensed second information is provided to the processor 312 via communications pathway 318. After receiving the sensed first information and the sensed second information, the processor 312 determines instruction data for moving the aircraft-engaging end of the passenger boarding bridge along a direction toward the doorway of the aircraft, based upon a predetermined correlation between the sensed first information and the sensed second information.

By way of a non-limiting example, the predetermined correlation requires that the sensed first information is indicative of the presence of the passenger boarding bridge adjacent to the aircraft, and that the sensed second information is indicative of the presence of the aircraft adjacent to the passenger boarding bridge. By way of another non-limiting example, the predetermined correlation requires that the sensed first information and the sensed second information is indicative of an unobstructed pathway between the passenger boarding bridge and the doorway of the aircraft. By way of yet another non-limiting example, the predetermined correlation requires that the sensed first information and the sensed second information is indicative of the aircraft-engaging end of the passenger boarding bridge moving toward the doorway of the aircraft.

Referring now to FIG. 4a, shown is a simplified top view of a passenger boarding bridge in a stowed position relative to a nose-in parked aircraft. The passenger boarding bridge 400 comprises a passageway 402 extending between terminal building 404 and pivotal cabin 406. An automated bridge controller (not shown) is provided in communication with a sensor 408, which sensor is disposed within pivotal cabin 406 and proximate the aircraft-engaging end of passenger boarding bridge 400 in this specific example. During a bridge alignment operation, the automated bridge controller provides control signals to a not illustrated drive system for extending the length of the passageway 402, for adjusting the height of the passageway 402, for angularly adjusting the passageway 402 and for pivoting the pivotal cabin 406. In the instant example, the sensor 408 is provided in the form of an imaging device, such as for example one of a digital still camera and a video camera, for capturing image data relating to a current bridge alignment operation. Of course, the sensor 408 captures image data from the point of view of the aircraft-engaging end of the passenger boarding bridge 400. The captured image data is provided from the sensor 408 to a processor (not shown), such as for instance a processor that is associated with the automated bridge controller.

Also shown in FIG. 4a is an aircraft 410 with a doorway 412, for instance a front left doorway of the aircraft, to which the passenger boarding bridge 400 is to be aligned. The aircraft 410 is equipped with a sensor 414, a processor 416, and a wireless transmitter 418. By way of a non-limiting example, the sensor 414 is provided in the form of an imaging device, such as for example one of a digital still camera and a video camera, for capturing image data relating to a current bridge alignment operation. Of course, the sensor 414 captures image data from the point of view of the aircraft. Image data is provided from the sensor 414 to the processor 416 and is pre-processed according to predetermined criteria. The pre-processed image data is provided to the wireless transmitter 418, is encoded as a signal for free-space transmission, and is transmitted to a processor at a location remote from the aircraft, such as for instance the processor associated with the automated bridge controller. Each sensor 408 and 414 captures image data within a field of view defined by the angle θ, the value of which optionally is the same or different for each sensor 408 and 414. Optionally, the processor 416 is omitted and the captured image data is encoded for transmission without being pre-processed. Further optionally, the placement of sensor 408 is outside of the pivotal cabin 406.

Referring now to FIG. 4b and FIG. 4c, shown are examples of image data captured by sensors 408 and 414, respectively, during a first example of a bridge alignment operation. In FIG. 4b the captured image data includes aircraft 410 with doorway 412 and sensor 414 being visible. In FIG. 4c the captured image data includes the passenger boarding bridge 400 with pivotal cabin 406 and sensor 408 being visible. The image data shown in FIG. 4b correlates with the image data shown in FIG. 4c, since the passenger boarding bridge 400 and the aircraft 410 effectively "see" one another. Based upon image data captured from two different points of view, the not illustrated processor determines that the aircraft 410 is present and that the passenger boarding bridge 400 is properly oriented and unobstructed. Since correlation is confirmed, the processor determines instruction data for moving the aircraft-engaging end of the passenger boarding bridge along a direction toward the doorway of the aircraft.

Figure 4D:
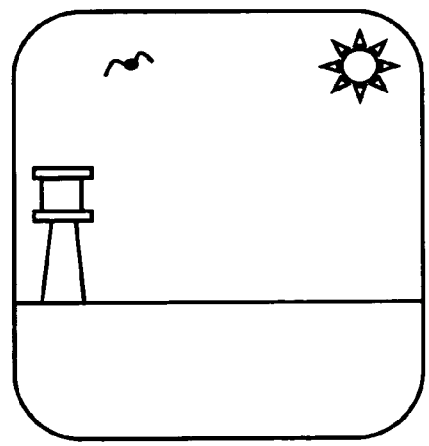
FIG. 4d is an example of image data captured by an imager disposed aboard the passenger boarding bridge, when the passenger boarding bridge is in a stowed position and the aircraft is not parked within a parking spaced that is defined adjacent to the passenger boarding bridge.
Figure 4E:
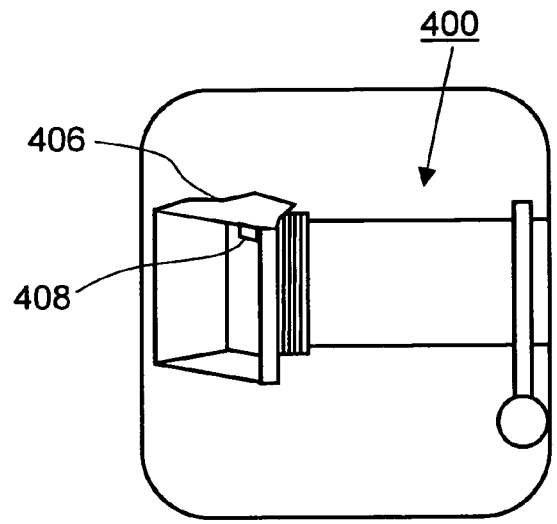
FIG. 4e is an example of image data captured by an imager disposed aboard the aircraft, when the aircraft is parked within a parking space that is defined adjacent to a passenger boarding bridge other than the passenger boarding bridge to which the aircraft is assigned.

Referring now to FIG. 4d and FIG. 4e, shown are examples of image data captured by sensors 408 and 414, respectively, during a second example of a bridge alignment operation. In FIG. 4d the captured image data does not include the aircraft 410. In FIG. 4e the captured image data includes the passenger boarding bridge 400 with pivotal cabin 406 and sensor 408 visible. The image data shown in FIG. 4d does not correlate with the image data shown in FIG. 4e, since the passenger boarding bridge 400 does not "see" the aircraft 410. In this case, the aircraft has parked adjacent to the wrong passenger boarding bridge, or more than one passenger boarding bridge is trying to dock with the same aircraft. Based upon the image data captured from two different points of view, the processor disables bridge alignment operations for passenger boarding bridge 400. Of course, if the aircraft 410 is also in communication with a processor of a different passenger boarding bridge, and if a processor associated with that different passenger boarding bridge determines correlation as described in the previous paragraph, then alignment of the different passenger boarding bridge to the doorway of the aircraft proceeds normally.

Figure 4F:
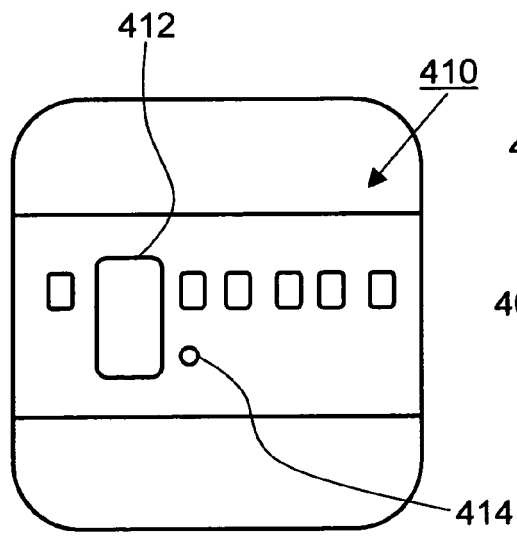
FIG. 4f is an example of image data captured by an imager disposed aboard the passenger boarding bridge, when the passenger boarding bridge is in a stowed position and the aircraft is parked within a parking spaced that is defined adjacent to the passenger boarding bridge and when an obstacle is disposed between the aircraft and the passenger boarding bridge.
Figure 4G:
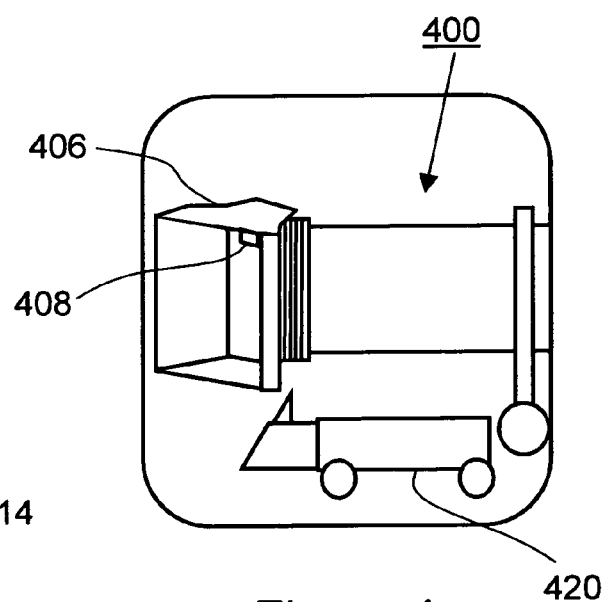
FIG. 4g is an example of image data captured by an imager disposed aboard the aircraft, when the passenger boarding bridge is in a stowed position and the aircraft is parked within a parking spaced that is defined adjacent to the passenger boarding bridge.

Referring now to FIG. 4f and FIG. 4g, shown are examples of image data captured by sensors 408 and 414, respectively, during a third example of a bridge alignment operation. In FIG. 4f the captured image data includes aircraft 410 with doorway 412 and sensor 414 being visible. In FIG. 4g the captured image data includes the passenger boarding bridge 400 with pivotal cabin 406 and sensor 408 being visible. However, a piece of ground service equipment 420 is also visible in the captured image data, and in a position that obstructs the passenger boarding bridge 400. The image data shown in FIG. 4f does not correlate with the image data shown in FIG. 4g, since the passenger boarding bridge "sees" an unobstructed path between the aircraft-engaging end of the passenger boarding bridge 400 and the doorway 412 of aircraft 410, but the aircraft 400 does not "see" an unobstructed path between the aircraft-engaging end of the passenger boarding bridge 400 and the doorway 412 of aircraft 410. Based upon the image data captured from two different points of view, the processor disables bridge alignment operations for passenger boarding bridge 400.

Referring now to FIG. 5a, shown is a simplified top view of a passenger boarding bridge relative to a nose-in parked aircraft after having moved along 'path A' from a stowed position. For instance, FIG. 5a represents the situation in which the processor determined correlation based upon the captured image data shown in FIGS. 4b and 4c, and accordingly the processor determined control signals for moving the passenger boarding bridge 400 along 'path A' toward the doorway 412 of aircraft 410.

Referring now to FIG. 5b and FIG. 5c, shown are examples of image data captured by sensors 408 and 414, respectively, after the passenger boarding bridge has moved along 'path A' from the stowed position. In FIG. 5b the captured image data includes aircraft 410 with doorway 412 and sensor 414 being visible. A smaller section of the aircraft 410 is imaged compared to FIG. 4b due to the fact that the sensor 408 is relatively closer to the aircraft. In FIG. 5c the captured image data includes the passenger boarding bridge 400 with pivotal cabin 406 and sensor 408 being visible. Additional features, such as door handle 422 may also become visible as distance decreases. The image data shown in FIG. 5b correlates with the image data shown in FIG. 5c, since the passenger boarding bridge 400 and the aircraft 410 still effectively "see" one another, and since the apparent size of the imaged features is consistent with the distance the passenger boarding bridge has moved along 'path A'. Since correlation is confirmed, the processor determines additional instruction data for moving the aircraft-engaging end of the passenger boarding bridge along a direction toward the doorway of the aircraft.

Figure 6A:
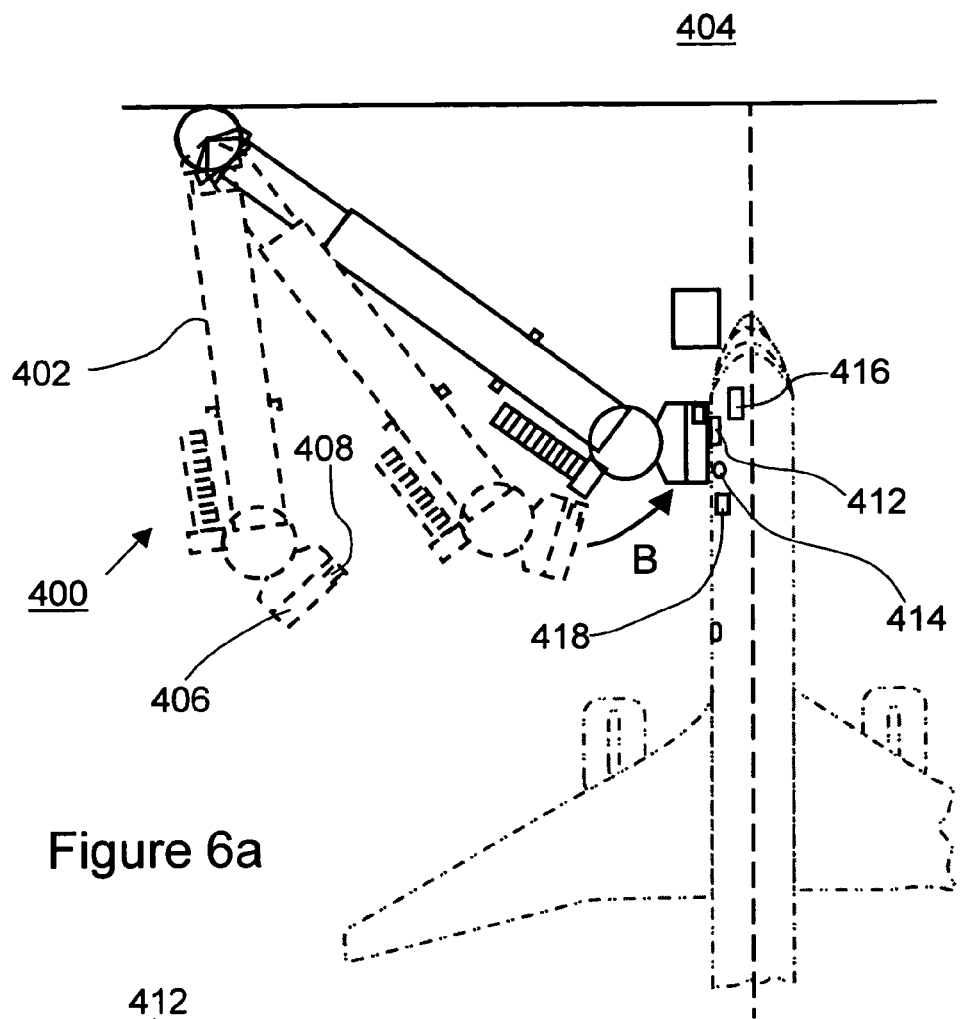
FIG. 6a is a simplified top view of a passenger boarding bridge relative to a nose-in parked aircraft after having moved along 'path B' into an aircraft-engaging position.

Referring now to FIG. 6a, shown is a simplified top view of a passenger boarding bridge relative to a nose-in parked aircraft after having moved along 'path B' into an aircraft-engaging position. For instance, FIG. 6a represents the situation in which the processor determined correlation based upon the captured image data shown in FIGS. 4b and 4c, and in FIGS. 5b and 5c, and accordingly the processor determined control signals for moving the passenger boarding bridge 400 along 'path B' toward the doorway 412 of aircraft 410.

Figures 6B, 6C:
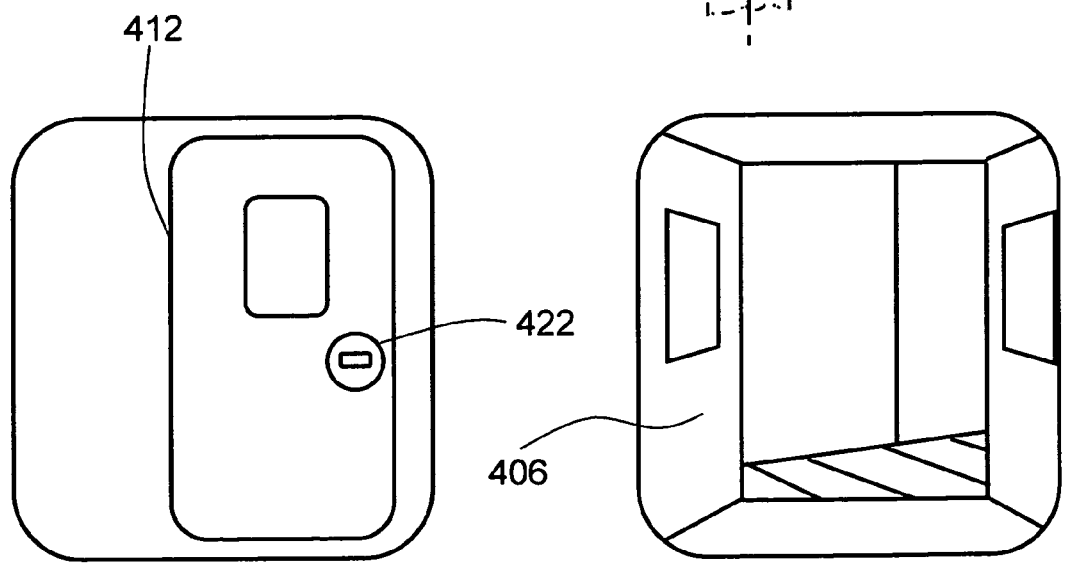
FIG. 6b is an example of image data captured by an imager disposed aboard the passenger boarding bridge when the passenger boarding bridge is in an aligned relationship with the doorway of the aircraft.
FIG. 6c is an example of image data captured by an imager disposed aboard the aircraft when the passenger boarding bridge is in an aligned relationship with the doorway of the aircraft.

Referring now to FIG. 6b and FIG. 6c, shown are examples of image data captured by sensors 408 and 414, respectively, after the passenger boarding bridge has moved along 'path B' into the aircraft-engaging position. The sensor 408 is sufficiently close to aircraft 410 that only the doorway 412 and features thereof, such as for instance door handle 422, are visible in the captured image data shown in FIG. 6b. Similarly, only the inside walls of pivotal cabin 406 leading into passageway 402 of passenger boarding bridge 400 are visible in the captured image data shown in FIG. 6c. Advantageously, imaging continues up to the point that alignment is completed. In this way, safety and accuracy are improved during alignment, since instructions for moving the passenger boarding bridge are based upon image data captured from two different points of view, and since correlation between the image data is required.

Figure 7:
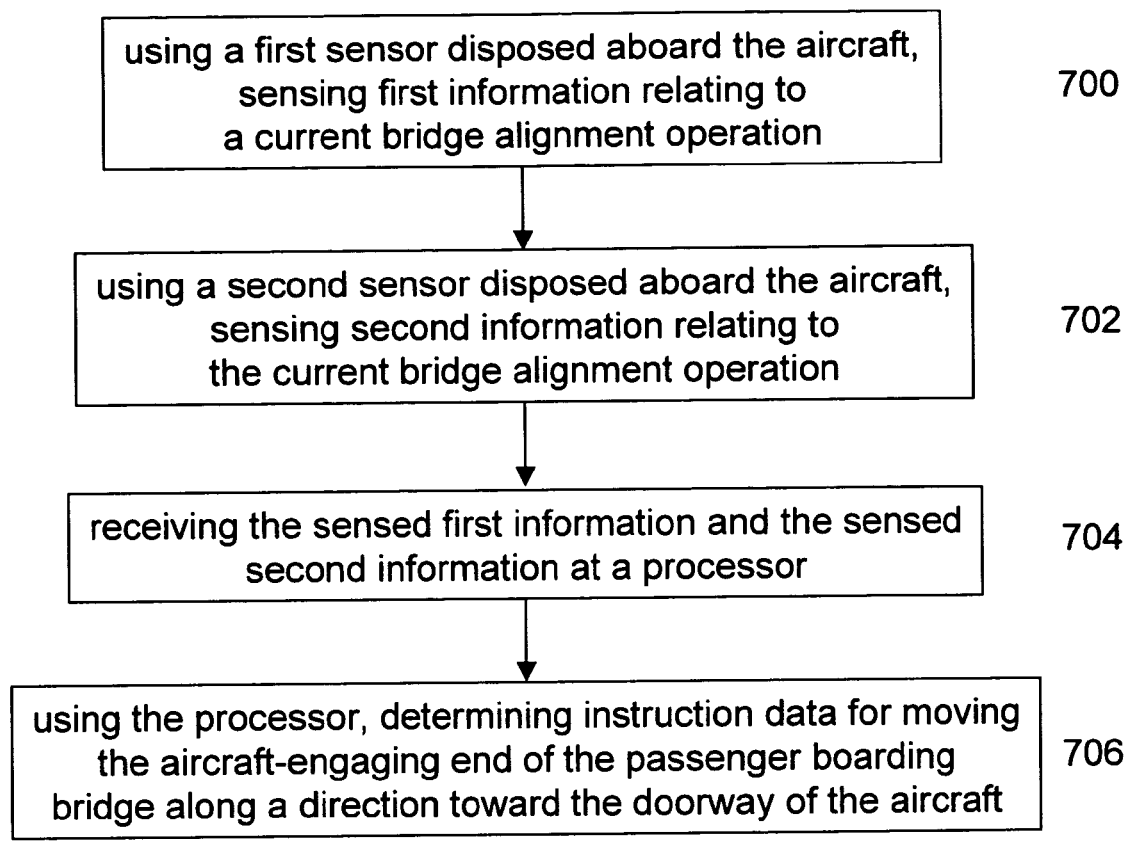
FIG. 7 is a simplified flow diagram of a method of aligning an aircraft-engaging end of a passenger boarding bridge with a doorway of an aircraft, according to an embodiment of the instant invention.

Referring now to FIG. 7, shown is a simplified flow diagram of a method for aligning an aircraft-engaging end of a passenger boarding bridge with a doorway of an aircraft. At step 700 a first sensor disposed aboard the aircraft is used for sensing first information relating to a current bridge alignment operation. At step 702 a second sensor disposed at a location that is remote from the aircraft is used for sensing second information relating to the current bridge alignment operation. Optionally, steps 700 and 702 are performed simultaneously. At step 704 the sensed first information and the sensed second information is received at a processor. At step 706 the processor is used for determining instruction data for moving the aircraft-engaging end of the passenger boarding bridge along a direction toward the doorway of the aircraft. The instruction data is determined based upon a predetermined correlation between the sensed first information and the sensed second information.

By way of a non-limiting example, the predetermined correlation requires that the sensed first information is indicative of the presence of the passenger boarding bridge adjacent to the aircraft, and that the sensed second information is indicative of the presence of the aircraft adjacent to the passenger boarding bridge. By way of another non-limiting example, the predetermined correlation requires that the sensed first information and the sensed second information is indicative of an unobstructed pathway between the passenger boarding bridge and the doorway of the aircraft. By way of yet another non-limiting example, the predetermined correlation requires that the sensed first information and the sensed second information is indicative of the aircraft-engaging end of the passenger boarding bridge moving toward the doorway of the aircraft.

Figure 8:
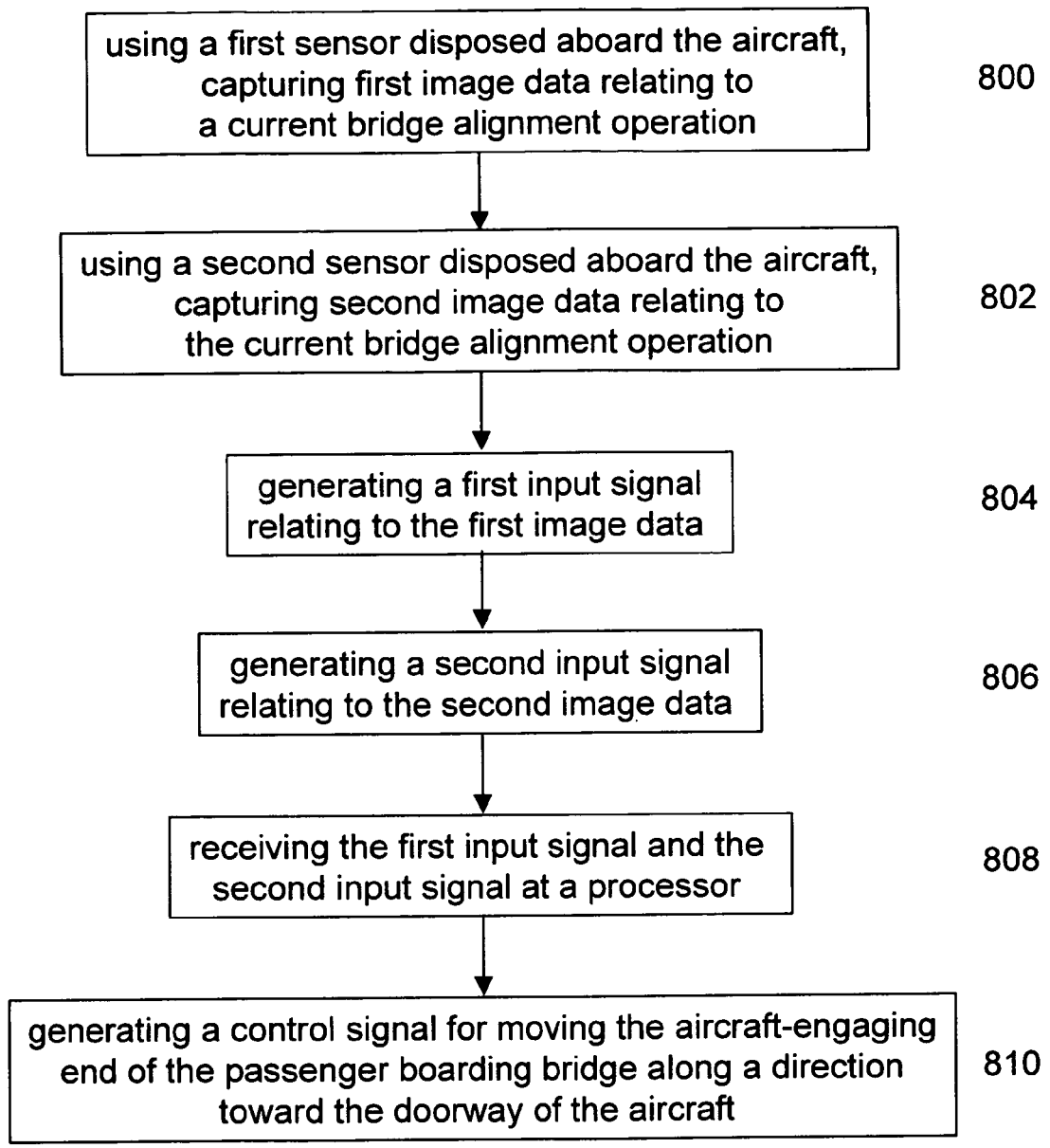
FIG. 8 is a simplified flow diagram of another method of aligning an aircraft-engaging end of a passenger boarding bridge with a doorway of an aircraft, according to an embodiment of the instant invention; and, FIG. 9 is a simplified flow diagram of another method of aligning an aircraft-engaging end of a passenger boarding bridge with a doorway of an aircraft, according to an embodiment of the instant invention.

Referring now to FIG. 8, shown is a simplified flow diagram of a method for aligning an aircraft-engaging end of a passenger boarding bridge with a doorway of an aircraft. At step 800 a first sensor disposed aboard the aircraft is used for capturing first image data relating to a current bridge alignment operation. At step 802 a second sensor disposed at a location that is remote from the aircraft is used for capturing second image data relating to the current bridge alignment operation. At step 804 a first input signal relating to the first image data is generated. At step 806 a second input signal relating to the second image data is generated. At step 808 the first input signal and the second input signal is received at a processor, the processor being in communication with the first sensor and with the second sensor. When a correlation between the first input signal and the second input signal is established that is within a predetermined range of threshold values, then at step 810 a control signal is determined, the control signal comprising instruction data for moving the aircraft-engaging end of the passenger boarding bridge along a direction toward the doorway of the aircraft.

Figure 9:
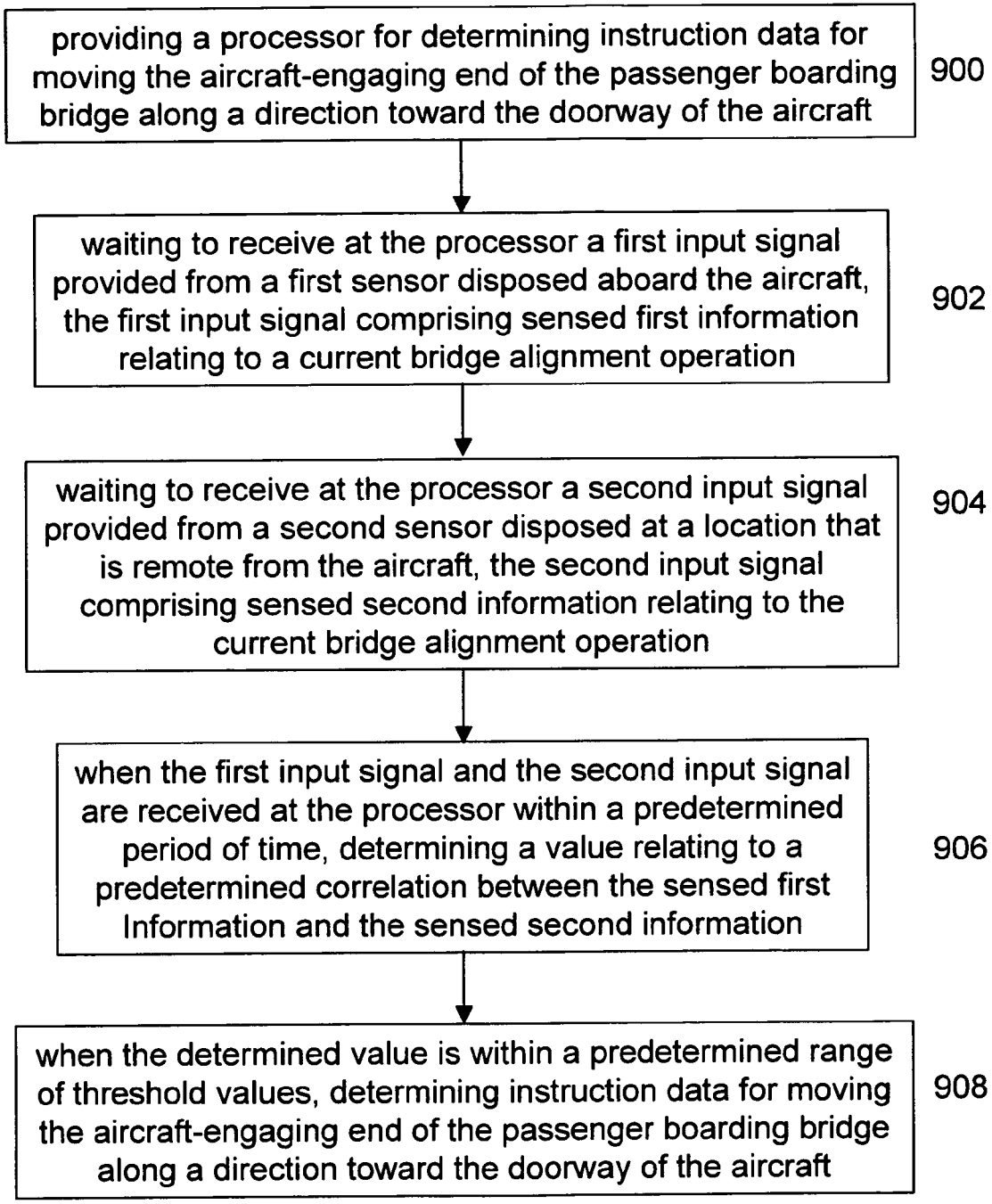

Referring now to FIG. 9, shown is a simplified flow diagram of a method for aligning an aircraft-engaging end of a passenger boarding bridge with a doorway of an aircraft. At step 900 a processor is provided for determining instruction data for moving the aircraft-engaging end of the passenger boarding bridge along a direction toward the doorway of the aircraft. Step 902 is a step of receiving at the processor a first input signal provided from a first sensor disposed aboard the aircraft, the first input signal comprising sensed first information relating to a current bridge alignment operation. Step 904 is a step of receiving at the processor a second input signal provided from a second sensor disposed at a location that is remote from the aircraft, the second input signal comprising sensed second information relating to the current bridge alignment operation. When the first input signal and the second input signal are received at the processor within a predetermined period of time, then at step 906 a value is determined relating to a predetermined correlation between the sensed first information and the sensed second information. When the determined value is within a predetermined range of threshold values, then at step 908 instruction data is determined for moving the aircraft-engaging end of the passenger boarding bridge along a direction toward the doorway of the aircraft.

In relation to the embodiments of the instant invention as described above, when a sensor is provided in the form of an imager then some form of image processing is performed to extract features from the captured image data. Various image processing techniques are known, and one of skill in the art will select a processing technique based upon factors including the processing capabilities of the processor, resolution and/or size of the image data, required response times, etc. When the processor determines a correlation between sensed first information and sensed second information, optionally a value is assigned to represent an extent or degree of correlation between the sensed first information and the sensed second information. For instance a value of zero represents no correlation and a value of one represents maximum correlation. Threshold values optionally are pre-set or are user selectable. During use, correlation to within the threshold values is required in order to proceed with the current bridge alignment operation. If the correlation falls outside the threshold values, then the current bridge alignment operation is aborted and manual bridge alignment is required. Optionally, correlation is established initially when the current bridge alignment operation commences and then alignment occurs in an automated manner without additional determinations of correlation between information sensed using a first sensor disposed aboard the aircraft and a second sensor disposed at a location that is remote from the aircraft. Further optionally, a plurality of correlations is determined between information sensed using a first sensor disposed aboard the aircraft and a second sensor disposed at a location that is remote from the aircraft. For instance, an initial correlation is determined based upon information sensed when the current bridge alignment operation is initiated, and at least one additional correlation is determined based upon other information that is sensed during the course of the current bridge alignment operation. In this case the plurality of correlations is indicative of an expected progression of the current bridge alignment operation to within predetermined safety limits.

Further optionally, in some of the embodiments of the instant invention as described above, the type of the first sensor is different than the type of the second sensor. One non-limiting example contemplates that the first sensor disposed aboard the aircraft is provided in the form of a digital still camera and the second sensor disposed at the location remote from the aircraft is provided in the form of a video camera. Another non-limiting example contemplates that the first sensor disposed aboard the aircraft is provided in the form of a digital still camera and the second sensor disposed at the location remote from the aircraft is provided in the form of a laser range finder. Another non-limiting example contemplates that the first sensor disposed aboard the aircraft is provided in the form of a laser range finder and the second sensor disposed at the location remote from the aircraft is provided in the form of a digital still camera. Other combinations are also envisaged. When dissimilar types of sensors are employed, then correlation is defined accordingly. For instance, when the first sensor disposed aboard the aircraft is provided in the form of a digital still camera and the second sensor disposed at the location remote from the aircraft is provided in the form of a laser range finder, then correlation may be defined as occurring when the image that is captured using the digital still camera is indicative of the passenger boarding bridge being in an expected orientation relative to the aircraft and when the laser range finder registers an object at a distance that is within the parking space adjacent to the passenger boarding bridge. Numerous other examples may also be envisage.

Of course, the sensed first information and the sensed second information relate to different perspectives of the same current bridge alignment operation. Some features contained in the sensed first information are also contained in the sensed second information, which features are useful but not required for determining correlation. Furthermore, the sensed first information includes features that are not included in the sensed second information, and vice versa. Accordingly, obtaining information from two spatially separated points of view provides additional information compared to sensing information from only the passenger boarding bridge or from only the aircraft. The additional information is useful for ensuring accuracy and safety during the bridge alignment operation, for avoiding collisions with obstacles on the ground, and for confirming expected progression of the alignment operation.

Numerous other embodiments may be envisaged without departing from the spirit and scope of the invention.

What is claimed is:

1. A method of aligning an aircraft-engaging end of a passenger boarding bridge with a doorway of an aircraft, comprising:

using a first sensor disposed aboard the aircraft, sensing first information relating to a current bridge alignment operation;

using a second sensor disposed at a location that is remote from the aircraft, sensing second information relating to the current bridge alignment operation;

receiving the sensed first information and the sensed second information at a processor; and, using the processor, determining instruction data for moving the aircraft-engaging end of the passenger boarding bridge along a direction toward the doorway of the aircraft, based upon the sensed first information and the sensed second information.

2. A method according to claim 1, wherein the determined instruction data comprises an abort command when the sensed first information and the sensed second information do not correlate to within a predetermined range of threshold values.

3. A method according to claim 1, wherein sensing first information comprises capturing first image data relating to the current bridge alignment operation, and wherein sensing second information comprises capturing second image data relating to the current bridge alignment operation.

4. A method according to claim 1, wherein the second sensor is disposed on the passenger boarding bridge and proximate the aircraft-engaging end.

5. A method according to claim 1, wherein receiving the sensed first information comprises receiving a first input signal relating to the sensed first information and wherein receiving the sensed second information comprises receiving a second input signal relating to the sensed second information.

6. A method according to claim 5, comprising transmitting the first input signal to the processor via a wireless transmitter module in communication with the first sensor.

7. A method according to claim 5, comprising pre-processing the sensed first information to generate the first input signal.

8. A method according to claim 7, comprising transmitting the first input signal to the processor via a wireless transmitter module in communication with the first sensor.

9. A method according to claim 1, wherein the instruction data is determined based upon a predetermined correlation between the sensed first information and the sensed second information.

10. A method according to claim 9, wherein the predetermined correlation between the sensed first information and the sensed second information is indicative of correct aircraft placement relative to the aircraft-engaging end of the passenger boarding bridge.

11. A method according to claim 9, wherein the predetermined correlation between the sensed first information and the sensed second information is indicative of an unobstructed path between the aircraft-engaging end of the passenger boarding bridge and the doorway of the aircraft.

12. A method according to claim 9, wherein the predetermined correlation between the sensed first information and the sensed second information is indicative of an expected progression of the current bridge alignment operation to within predetermined safety limits.

13. A method of aligning an aircraft-engaging end of a passenger boarding bridge with a doorway of an aircraft, comprising:
using a first sensor disposed aboard the aircraft, capturing first image data relating to a current bridge alignment operation;
using a second sensor disposed at a location that is remote from the aircraft, capturing second image data relating to the current bridge alignment operation;
generating a first input signal relating to the first image data;
generating a second input signal relating to the second image data;
receiving the first input signal and the second input signal at a processor; and,
when a correlation between the first input signal and the second input signal is established that is within a predetermined range of threshold values, determining a control signal comprising instruction data for moving the aircraft-engaging end of the passenger boarding bridge along a direction toward the doorway of the aircraft.

14. A method according to claim 13, wherein the control signal is determined based upon the first input signal and the second input signal.

15. A method according to claim 13, wherein the second sensor is disposed on the passenger boarding bridge and proximate the aircraft-engaging end.

16. A method according to claim 13, comprising aborting the current bridge alignment operation when a correlation between the first input signal and the second input signal is established that is outside the predetermined range of threshold values.

17. A method according to claim 13, comprising transmitting the first input signal to the processor via a wireless transmitter module in communication with the first sensor.

18. A method of aligning an aircraft-engaging end of a passenger boarding bridge with a doorway of an aircraft, comprising:
providing a processor for determining instruction data for moving the aircraft-engaging end of the passenger boarding bridge along a direction toward the doorway of the aircraft;
receiving at the processor a first input signal provided from a first sensor disposed aboard the aircraft, the first input signal comprising sensed first information relating to a current bridge alignment operation;
receiving at the processor a second input signal provided from a second sensor disposed at a location that is remote from the aircraft, the second input signal comprising sensed second information relating to the current bridge alignment operation;
when the first input signal and the second input signal are received at the processor within a predetermined period of time, determining a value relating to a predetermined correlation between the sensed first information and the sensed second information; and,
when the determined value is within a predetermined range of threshold values, determining instruction data for moving the aircraft-engaging end of the passenger boarding bridge along a direction toward the doorway of the aircraft.

19. A method according to claim 18, comprising aborting the current bridge alignment operation when the first input signal and the second input signal are not received at the processor within the predetermined period of time.

20. A method according to claim 18, comprising aborting the current bridge alignment operation when the determined value is outside the predetermined range of threshold values.

21. A method according to claim 18, wherein the predetermined correlation between the sensed first information and the sensed second information is indicative of correct aircraft placement relative to the aircraft-engaging end of the passenger boarding bridge.

22. A method according to claim 18, wherein the predetermined correlation between the sensed first information and the sensed second information is indicative of an unobstructed path between the aircraft-engaging end of the passenger boarding bridge and the doorway of the aircraft.

23. A method according to claim 18, wherein the predetermined correlation between the sensed first information and the sensed second information is indicative of an expected progression of the current bridge alignment operation to within predetermined safety limits.

24. A system for aligning an aircraft-engaging end of a passenger boarding bridge with a doorway of an aircraft, comprising:
a first sensor disposed aboard the aircraft for sensing first information relating to a current bridge alignment operation;
a second sensor disposed at a location that is remote from the aircraft, for sensing second information relating to the current bridge alignment operation;
a processor in communication with the first sensor and with the second sensor for receiving the sensed first information and the sensed second information, respectively, and for determining instruction data for moving the aircraft-engaging end of the passenger boarding bridge along a direction toward the doorway of the aircraft, based upon a predetermined correlation between the sensed first information and the sensed second information.

25. A system according to claim 24, wherein the first sensor comprises a first imaging device for capturing image data and wherein sensing first information comprises capturing first image data relating to the current bridge alignment operation.

26. A system according to claim 24, wherein the second sensor comprises a second imaging device for capturing image data and wherein sensing second information comprises capturing second image data relating to the current bridge alignment operation.

27. A system according to claim 24, wherein the second sensor is disposed on the passenger boarding bridge and proximate the aircraft-engaging end.

28. A system according to claim 24, comprising a transmitter module in communication with the first sensor for wirelessly transmitting to the processor a signal comprising the sensed first information.

29. A system according to claim 24, wherein the first sensor is disposed about a point that is proximate the doorway.

* * * * *